No. 830,334. PATENTED SEPT. 4, 1906.
F. C. KUMMEROW.
ROTARY MOTOR.
APPLICATION FILED MAY 10, 1905.

2 SHEETS—SHEET 1.

Witnesses
R. A. Fischer
E. M. Scherbarth

Inventor
Ferdinand C. Kummerow
By Rudolph Wm. Lotz
Atty

No. 830,334. PATENTED SEPT. 4, 1906.
F. C. KUMMEROW.
ROTARY MOTOR.
APPLICATION FILED MAY 10, 1905.

Witnesses
R. A. Fischer
E. M. Scherbarth

Inventor
Ferdinand C. Kummerow
By Rudolph M. Foy
Atty.

UNITED STATES PATENT OFFICE.

FERDINAND C. KUMMEROW, OF CHICAGO, ILLINOIS.

ROTARY MOTOR.

No. 830,334.　　　Specification of Letters Patent.　　　Patented Sept. 4, 1906.

Application filed May 10, 1905. Serial No. 259,777.

*To all whom it may concern:*

Be it known that I, FERDINAND C. KUMMEROW, a citizen of the United States, residing at Chicago, in the county of Cook and State of Illinois, have invented certain new and useful Improvements in Rotary Motors; and I do hereby declare the following to be a full, clear, and exact description of the invention, such as will enable others skilled in the art to which it appertains to make and use the same.

My invention relates to a novel construction in a rotary motor, the object being to provide a simple, efficient, and economical device of this character; and it consists in the features of construction and combinations of parts hereinafter fully described and claimed.

Figure 1:
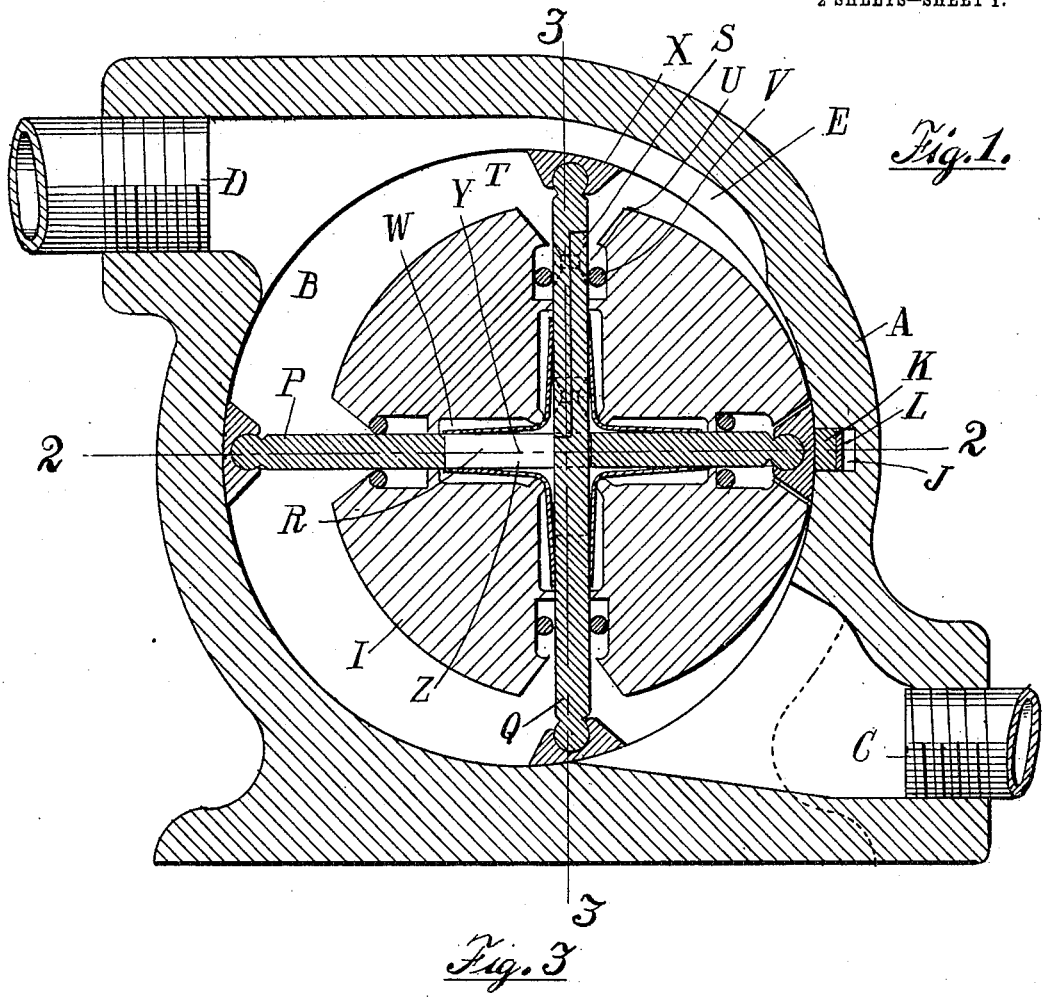
Figure 3:
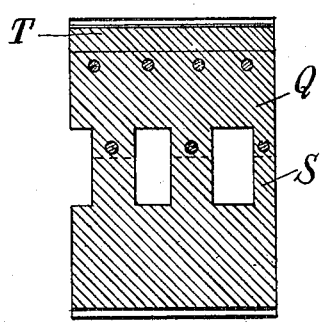
Figure 2:
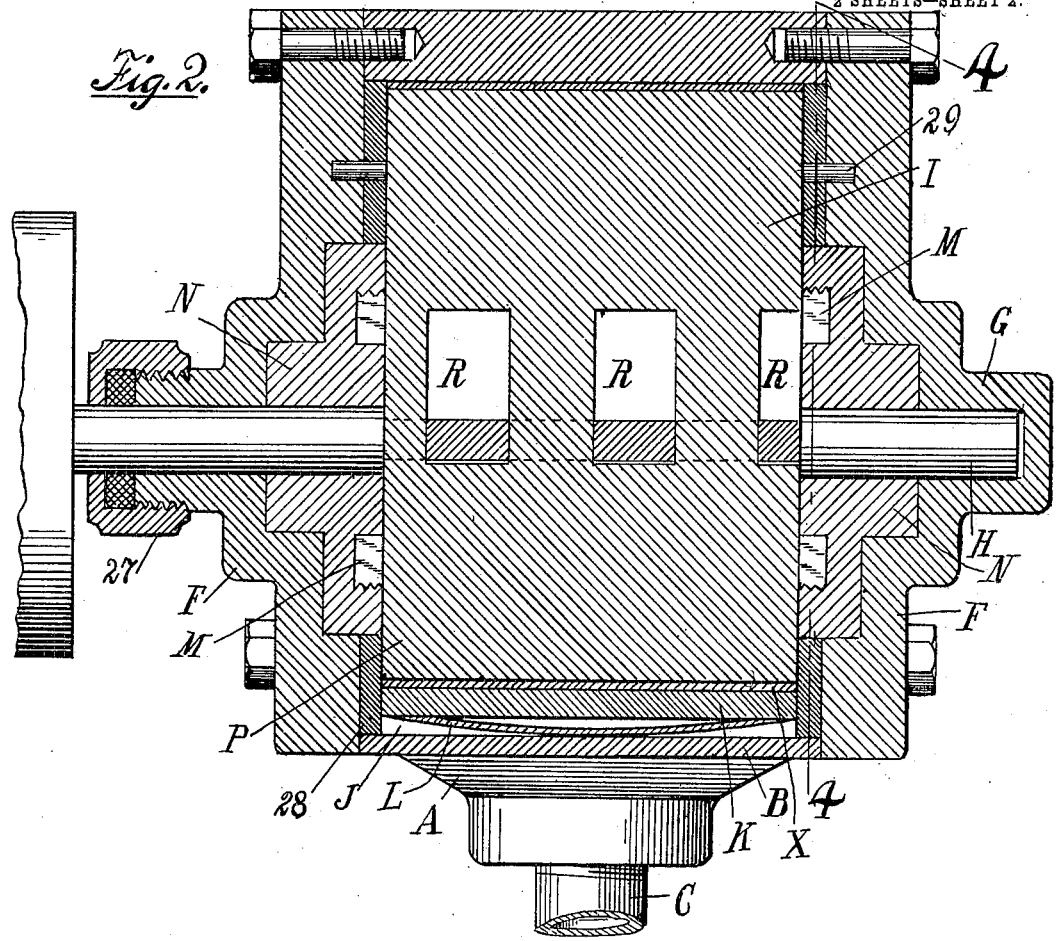
Figure 4:
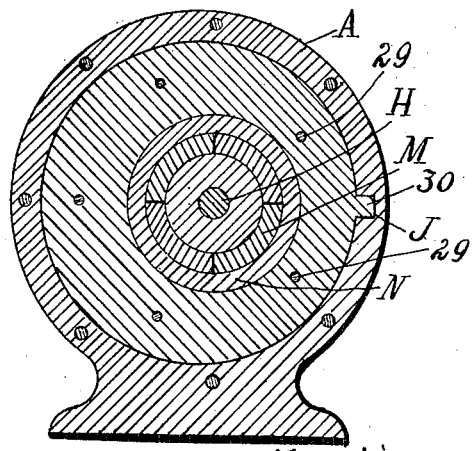

In the accompanying drawings, illustrating my invention, Figure 1 is a central longitudinal section of a motor constructed in accordance with my invention. Fig. 2 is a plan section of same on the line 2 2 of Fig. 1. Fig. 3 is a detail section on the line 3 3 of Fig. 1. Fig. 4 is a detail vertical section on the line 4 4 of Fig. 2.

My said motor comprises a casing A, provided with a horizontally-disposed substantially cylindrical chamber B, provided at diametrically opposite points with an inlet and an exhaust port for the driving fluid, which are substantially tangentially disposed, said ports being designated by C and D, respectively. The wall of the chamber B is provided with a groove or recess E, connected at one end with the exhaust-port and serving substantially as an extension of the latter. The said chamber B is adapted to be closed at its ends by means of the heads F, each of which is provided with an eccentrically-disposed bearing G for the shaft H of the rotating member I, mounted within said cylinder. Said rotating member I is cylindrical and of smaller diameter than said chamber B, but so disposed that the periphery thereof is substantially in contact at one point with the wall of said chamber B, the latter being provided at said point with a longitudinal recess J, in which a member or plate K is movably mounted and normally held in contact with the periphery of said member I by means of a flat spring L. The said member I consists, substantially, of four quarter-segments fitted together and provided at their ends with externally-threaded projections forming trunnions M, which are received in the threaded portions of hubs N, which serve to hold said members or quarter-segments in proper relative position and afford means for securing same to the said shaft. The said hubs are adapted to fit within recesses in said heads provided therefor, and thus relieve the shafts and the bearings thereof of a considerable portion of wear and tear. The said quarter-segments are relatively so disposed that between the same radial passages O are provided, through which plates P and Q are adapted to pass, said plate P being provided at its middle portion and on one edge with slots R, through which the correspondingly-spaced tongues S of the plate Q are adapted to pass, the latter being adapted to receive an extension member T at their free ends, suitably secured thereto, said members P and Q being movable relatively to each other, but maintained always at right angles to each other. In order to permit them to move freely in said passages, the latter are provided with recesses U, in which anti-friction-rollers V are contained, which bear against opposite faces of said plates P and Q and form, so to speak, roller-bearing therefor. The said members are further provided inwardly of said recesses U with recesses W, in which the free ends of substantially L-shaped flat springs are disposed, which bear upon opposite sides of each of the plates P and Q and serve to produce substantially steam-tight joints to prevent steam from passing through said radial passages. The free ends of said plates P and Q are made substantially cylindrical, or, rather, in the shape of segments of cylinders, and are adapted to receive shoes X, provided with grooves adapted to receive said heads or ends of said plates and on their outer faces to bear against the inner wall of said chamber B. The said chamber B is not exactly cylindrical, but is formed on what may be termed two "centers" Y and Z, respectively, this being done for the reason that the said revolving member I being set eccentrically relatively to said chamber one of said plates must necessarily always form a chord of the cylinder, and such chord is necessarily shorter than the diameter. Hence if the plates P and Q, with the shoes thereof, are made of a length equal to the diameter of the chamber B, assuming that the same are cylindrical, then a partial revolution of said member I would necessarily cause the same to become jammed. By making the contour of said member B on two or more centers, however, this difficulty can be overcome, so as to prevent jamming or excessively-loose running at any point during a revolution.

In order to render the motor steam-tight, one of the bearings for the shaft is closed at one end and the other thereof carries a stuffing-box 27. To prevent steam from passing at the sides of the said plates P and Q, I further provide rings 28, of suitable antifriction metal, fitting over the hubs N inside the casing A, said rings being held against revolution by means of dowel-pins 29 and a peripheral projection 30 at one point adapted to fit within the said groove J in the wall of the chamber B.

My said motor operates in a very simple manner. The steam admitted at C impinges against one of said plates P or Q, between which and the said plate K a steam-chamber is formed, the latter tapering to a point at one end. The steam-pressure against said member forces the steam around toward the exhaust-port D, but before the same has reached a position opposite said inlet C, and another steam-chamber is then presented for the action of the steam-pressure. As the second chamber is brought into communication with the inlet, the first chamber still communicates therewith and actually does the work, the second chamber being brought into action only when the first chamber has been cut off from communication with said inlet. Before the third chamber has been brought into communication with the inlet the first chamber will communicate with the exhaust and through the medium of the groove E remains in communication with said exhaust until it has closely approached the said head or plate K, which shuts off communication between said inlet C and said exhaust-port, so that any leakage at this point is incapable of creating back pressure to an extent sufficient to be noticed.

Suitable means for governing the speed of the motor may be provided, if desired; but I have omitted such means from illustration.

My said motor is very simple, durable, and efficient and is adapted for use for all purposes for which motor-power is required.

I claim as my invention—

1. In a rotary engine, the combination with a casing having a substantially cylindrical chamber therein, and provided with an inlet and an exhaust port communicating with said chamber at substantially diametrically opposite points, of an eccentrically-disposed rotating member in said chamber, two relatively perpendicularly disposed plates passing therethrough and radially reciprocally movable therein, each of said plates being provided between its ends with longitudinal slots through which the portions of the other plate between the slots therein pass, said plates being substantially equal in length to the diameter of said chamber and shoes on the ends of said plates adapted to travel on the peripheral wall of said chamber.

2. In a rotary engine, the combination with a casing having a substantially cylindrical chamber therein, and provided with an inlet and an exhaust port communicating with said chamber at substantially diametrically opposite points, of an eccentrically-disposed rotating member in said chamber, two relatively perpendicularly disposed plates passing therethrough and radially reciprocally movable therein, each of said plates being provided between its ends with longitudinal slots through which the portions of the other plate between the slots therein pass, antifriction-rollers disposed between said plates and the adjacent walls of the passages in said rotating member, said plates being substantially equal in length to the diameter of said chamber and shoes on the ends of said plates adapted to travel on the peripheral wall of said chamber.

3. In a rotary engine, the combination with a casing having a substantially cylindrical chamber therein, and provided with an inlet and an exhaust port communicating with said chamber at substantially diametrically opposite points, of an eccentrically-disposed rotating member in said chamber, two relatively perpendicularly disposed plates passing therethrough and radially reciprocally movable therein, each of said plates being provided between its ends with longitudinal slots through which the portions of the other plate between the slots therein pass, antifriction-rollers disposed between said plates and the adjacent walls of the passages in said rotating member, means disposed in said passages for maintaining fluid-tight joints between the walls thereof and said plates, said plates being substantially equal in length to the diameter of said chamber and shoes on the ends of said plates adapted to travel on the peripheral wall of said chamber.

4. In a rotary engine, the combination with a casing having a substantially cylindrical chamber and provided with an inlet and an exhaust port communicating with said chamber at substantially diametrical points, of a substantially cylindrical rotating member in said chamber disposed eccentrically thereto and consisting of four substantially quarter-segments fitted together and provided with two diametric passages through said member, two radially-movable plates disposed in said passages and movable longitudinally therein, shoes at the ends of said plates engaging the wall of said chamber, antifriction-rollers disposed in said passages and engaging said plates, and means disposed in said passages to effect fluid-tight joints between the various arms of said passages.

In testimony whereof I have signed my name in presence of two subscribing witnesses.

FERDINAND C. KUMMEROW.

Witnesses:
 RUDOLPH WM. LOTZ,
 WILLIAM F. BENZING.